United States Patent
Li et al.

(10) Patent No.: US 12,505,580 B2
(45) Date of Patent: Dec. 23, 2025

(54) INFERENCE PROCESSING OF DATA

(71) Applicant: Telefonaktiebolaget LM Ericsson (publ), Stockholm (SE)

(72) Inventors: Yun Li, Lund (SE); Alexander Hunt, Tygelsjö (SE); Saeed Bastani, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1030 days.

(21) Appl. No.: 17/624,160

(22) PCT Filed: Jul. 2, 2019

(86) PCT No.: PCT/EP2019/067775
§ 371 (c)(1),
(2) Date: Dec. 30, 2021

(87) PCT Pub. No.: WO2021/001030
PCT Pub. Date: Jan. 7, 2021

(65) Prior Publication Data
US 2022/0351422 A1    Nov. 3, 2022

(51) Int. Cl.
*G06T 9/00*        (2006.01)
*H04N 19/593*   (2014.01)

(52) U.S. Cl.
CPC ........... *G06T 9/002* (2013.01); *H04N 19/593* (2014.11)

(58) Field of Classification Search
None
See application file for complete search history.

(56) References Cited

U.S. PATENT DOCUMENTS

| | | | |
|---|---|---|---|
| 12,261,631 B2* | 3/2025 | Galvin | G06N 20/00 |
| 2004/0158878 A1* | 8/2004 | Ratnakar | H04N 19/132 |
| | | | 375/E7.176 |

(Continued)

FOREIGN PATENT DOCUMENTS

| | | |
|---|---|---|
| EP | 3322188 A1 | 5/2018 |
| GB | 2492396 A | 1/2013 |

OTHER PUBLICATIONS

Multi-Mode Inference Engine for Convolutional Neural Networks Arash Ardakani, Carlo Condo and Warren J. Gross Electrical and Computer Engineering Department, McGill University, Montreal, Quebec, Canada; Dec. 11, 2017 (Year: 2017).*

(Continued)

*Primary Examiner* — Nancy Bitar
(74) *Attorney, Agent, or Firm* — Sage Patent Group

(57) ABSTRACT

A method for processing data in a system configured to operate in either of at least a first power mode and a second power mode, wherein the first power mode is associated with a first power level and the second power mode is associated with a second power level, the second power level being higher than the first power level, wherein the first and second power modes each are configured to prepare a respective model for inference processing is disclosed. The method comprises acquiring (101) compressed data, determining (102) whether the system operates in the first power mode or in the second power mode. The method further comprises, when the system operates in the first power mode, determining (103) whether the acquired compressed data comprises a self-contained frame, and if so partly decoding (104) the self-contained frame, performing (105) feature extraction of the decoded self-contained frame, preparing (107) the model for inference processing in the first power mode in the system, wherein the model comprises inference parameters for the first power mode, and perform- (Continued)

ing (108) inference processing by a neural network based on the extracted features and the prepared model for inference processing. Corresponding computer program product, apparatus, and system are also disclosed.

20 Claims, 5 Drawing Sheets

(56) References Cited

U.S. PATENT DOCUMENTS

| | | | |
|---|---|---|---|
| 2019/0045207 A1 | 2/2019 | Chen et al. | |
| 2019/0087690 A1* | 3/2019 | Srivastava | G06V 40/166 |
| 2021/0125070 A1* | 4/2021 | Wang | G06N 3/063 |
| 2021/0342600 A1* | 11/2021 | Westmacott | G06F 18/2148 |
| 2022/0357422 A1* | 11/2022 | Kuo | G01S 13/931 |

OTHER PUBLICATIONS

Ren, R. et al., Energy Aware Decoders: a Case Study Based on an RVC CAL Specification, Proceedings of the 2014 Conference on Design and Architectures for Signal and Image Processing, Oct. 8-10, 2014, pp. 1-6, Madrid, Spain.

Wang, J. et al., "Face Detection Using DCT Coefficients in MPEG Video", In Proceedings of International Workshop on Advanced Image Technology, 2002, pp. 1-7.

Mallikarachchi, T., "HEVC Encoder Optimization and Decoding Complexity-Aware Video Encoding", Submitted for the Degree of Doctor of Philosophy from the University of Surrey, Jul. 2017, pp. 1-153, Centre for Vision, Speech and Signal Processing, Faculty of Engineering and Physical Sciences.

Hierglotz, C. et al., "Modeling the Energy Consumption of the HEVC Decoding Process", IEEE Transactions on Circuits and Systems for Video Technology, Jan. 2018, pp. 217-229.

* cited by examiner

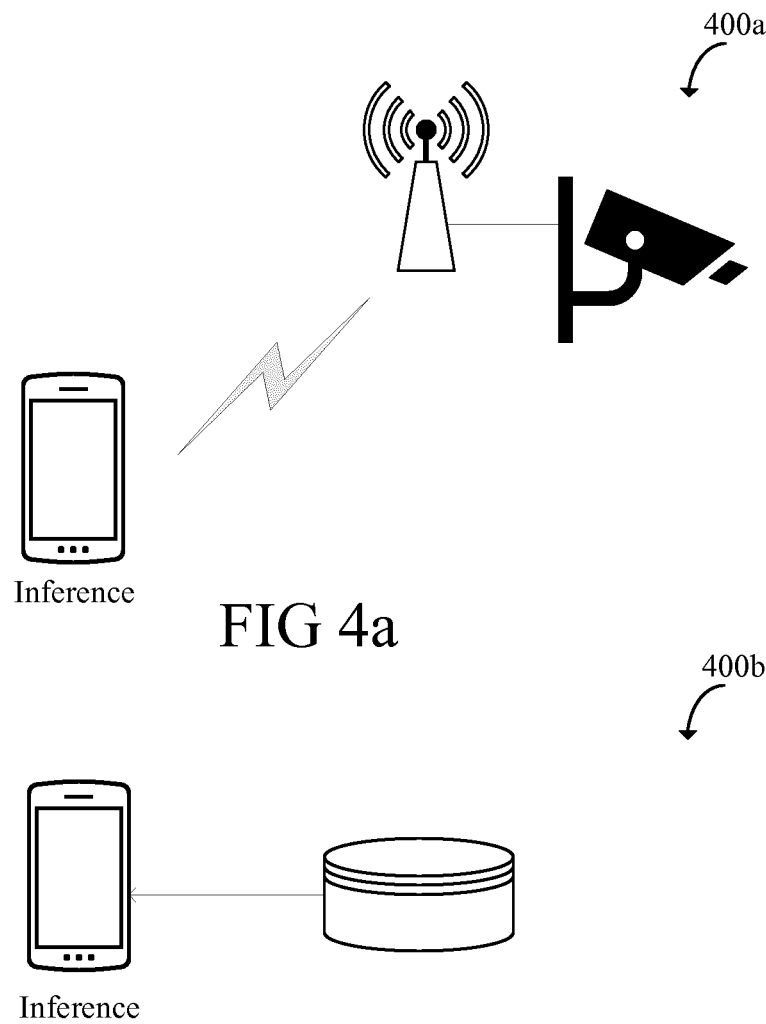
FIG 4a
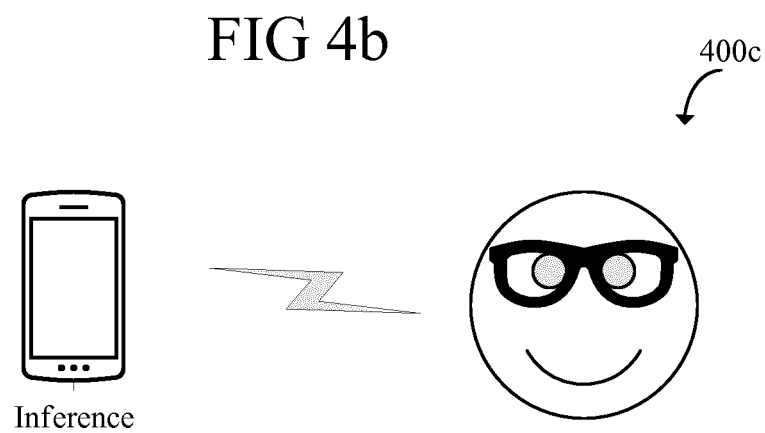
FIG 4b
FIG 4c

INFERENCE PROCESSING OF DATA

TECHNICAL FIELD

The present disclosure relates generally to the field of inference processing of data. More particularly, it relates to inference processing of data in a system configured to operate in either of at least a first power mode and a second power mode.

BACKGROUND

A neural network is a network with a certain level of complexity represented as a set of layers wherein the layers are categorized as input, hidden and output. Every neural network has an input layer comprising a collection of input units, at least one hidden layer, and an output layer comprising a collection of output units.

A layer comprises a set of computational (physical or virtual) units which receives layer input, processes the layer input, and produces layer output. The layer output of the output layer is usually used for predictions, e.g. classification.

A neural network is a function approximator capable of approximating a function for the given inputs and outputs to perform complex tasks, e.g., pattern recognition.

Neural networks have thus emerged as an Artificial Intelligence technique for inference processing e.g. for image classification and object detection in a pixel domain of image and video data.

However, in most cases, the image and video data are in a compressed format for practical storage and transmission. Therefore, decompressed image and video data, i.e. content, or raw format are often unavailable in practice and a full decompression may consume more power and resources.

A drawback of processing data in the pixel domain for compressed image and video data is that the processing of data may consume more power and resources as a full decoding must be performed.

In addition, for modern video codecs, the processing of data directly from Discrete Cosine Transform (DCT) coefficients may not provide a meaningful interpretation as prediction, such as intra prediction, is performed before DCT transform, and only the residues produced from the prediction are transformed i.e. quantized, hence, the DCT or DCT like transform coefficients may not exactly reflect the image contents in the pixel domain.

Therefore, there is a need for alternative approaches for processing data.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other drawbacks.

According to a first aspect, this is achieved by a method for processing data in a system configured to operate in either of at least a first power mode and a second power mode, wherein the first power mode is associated with a first power level and the second power mode is associated with a second power level, the second power level being higher than the first power level, wherein the first and second power modes each are configured to prepare a respective model for inference processing.

The method comprises acquiring compressed data and determining whether the system operates in the first power mode or in the second power mode.

The method further comprises, when the system operates in the first power mode, determining whether the acquired compressed data comprises a self-contained frame, and if so partly decoding the self-contained frame, performing feature extraction of the decoded self-contained frame, preparing the model for inference processing in the first power mode in the system, wherein the model comprises inference parameters for the first power mode, and performing inference processing by a neural network based on the extracted features and the prepared model for inference processing.

In some embodiments, the inference processing in the first power mode is performed in a compressed domain comprising compressed data.

In some embodiments, the method further comprises performing down-sampling of the extracted features.

In some embodiments, the method further comprises, when the system operates in the second power mode, decompressing the acquired compressed data, preparing the model for inference processing of the second power mode in the system, wherein the model comprises inference parameters for the second power mode, and performing inference processing by the neural network based on the decompressed data and the prepared model for inference processing.

In some embodiments, the method further comprises repeating at least the steps of the first aspect until the acquired compressed data has been processed.

In some embodiments, the inference processing in the second power mode is performed in a pixel domain comprising decompressed data.

In some embodiments, the method further comprises training of the model for inference processing corresponding to the first power mode by collecting and utilizing inference information either from a trained model corresponding to the second power mode or from a trained model independently offline.

In some embodiments, the system is capable of switching between the at least first and second modes depending on the power mode of the system and/or an event indicative of battery power running low.

In some embodiments, the acquired compressed data comprises a received stream of compressed data.

In some embodiments, the self-contained frame comprises an intra-prediction frame.

In some embodiments, the extracted features comprise one or more of: prediction modes, transform coefficients, and quantization parameters.

In some embodiments, the decoding comprises entropy decoding.

In some embodiments, the inference parameters are retrieved from a storage in the system or obtained from a remote storage.

In some embodiments, the inference parameters are retrieved or obtained from storage when it is determined in which power mode the system is operating in.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for processing data in a system configured to operate in either of at least a first power mode and a second power mode, wherein the first power mode is associated with a first power level and the second power mode is associated with a second power level, the second power level being higher than the first power level, wherein the first and second power modes each are configured to prepare a respective model for inference processing.

The apparatus comprises a memory comprising executable instructions, one or more processors configured to communicate with the memory wherein the one or more processors are configured to cause acquisition of compressed data, and determination of whether the system operates in the first power mode or in the second power mode.

The one or more processors are further configured to cause, when the system operates in the first power mode, determination of whether the acquired compressed data comprises a self-contained frame, and if so partly decode of the self-contained frame, feature extraction of the decoded self-contained frame, preparation of the model for inference processing in the first power mode in the system, wherein the model comprises inference parameters for the first power mode, and inference processing by a neural network based on the extracted features and the prepared model for inference processing.

In some embodiments, the inference processing in the first power mode is performed in a compressed domain comprising compressed data.

In some embodiments, the one or more processors are further configured to cause down-sampling of the extracted features.

In some embodiments, the one or more processors are further configured to cause, when the system operates in the second power mode, decompression of the acquired compressed data, preparation of the model for inference processing of the second power mode in the system, wherein the model comprises inference parameters for the second power mode, and inference processing by the neural network based on the decompressed data and the prepared model for inference processing.

In some embodiments, the inference processing in the second power mode is performed in a pixel domain comprising decompressed data.

In some embodiments, the one or more processors are further configured to cause, training of the model for inference processing corresponding to the first power mode by collecting and utilizing inference information either from a trained model corresponding to the second power mode or from a trained model independently offline.

In some embodiments, the system is capable of switching between the at least first and second modes depending on the power mode of the system and/or an event indicative of battery power running low.

In some embodiments, the acquisition of compressed data comprises reception of a stream of compressed data.

In some embodiments, the self-contained frame comprises an intra-prediction frame.

In some embodiments, the extracted features comprise one or more of: prediction modes, transform coefficients, and quantization parameters.

In some embodiments, the decoding comprises entropy decoding.

In some embodiments, the inference parameters are retrieved from a storage in the system or obtained from a remote storage.

In some embodiments, the inference parameters are retrieved or obtained from storage when it is determined in which power mode the system is operating in.

An fourth aspect is a system for processing data in a system configured to operate in either of at least a first power mode and a second power mode, wherein the first power mode is associated with a first power level and the second power mode is associated with a second power level, the second power level being higher than the first power level, wherein the first and second power modes each are configured to prepare a respective model for inference processing.

The system comprises an acquirer configured to acquire compressed data, a determiner configured to determine whether the system operates in the first power mode or in the second power mode.

The system further comprises a determiner configured to determine whether the acquired compressed data comprises a self-contained frame, a decoder configured to partly decode the self-contained frame, a feature extractor configured to perform feature extraction of the decoded self-contained frame, an inference model preparer configure to prepare the model for inference processing in the first power mode in the system, wherein the model comprises inference parameters for the first power mode, and an inference processing performer configured to perform inference processing by a neural network based on the extracted features and the prepared model for inference processing.

In some embodiments, the system further comprises a down-sampler configured to down-sample the extracted features.

In some embodiments, the system further comprises a de-compressor configured to decompress the acquired compressed data, and an inference processing performer configured to perform inference processing by the neural network based on the decompressed data and the prepared model for inference processing.

In some embodiments, the system further comprises a model trainer configured to train the model for inference processing in the first power mode by collecting and utilizing information of inference processing in the system performed while the system operates in the second power mode.

In some embodiments, the system further comprises a storage configured to store the inference parameters of a model corresponding to a power mode of the system.

A fifth aspect is an electronic user device comprising the apparatus and/or the system according to any of the third and fourth aspects.

In some embodiments, the electronic user device comprises any of an electronic user device connectable to a video surveillance system, an electronic user device connectable to an information retrieval system, and an electronic user device connectable to a wearable device system.

In some embodiments, any of the above aspects may additionally have features identical with or corresponding to any of the various features as explained above for any of the other aspects.

An advantage of some embodiments is that alternative approaches for processing data are provided.

Another advantage of some embodiments is that power and resource consumption for processing of data may be reduced.

Yet an advantage of some embodiments is that processing of data for compressed image and video data in the compressed domain may be enabled.

Yet another advantage of some embodiments is that processing of data in either pixel domain or compressed domain depending on the power mode of the system may be performed.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

FIG. 4a is a schematic block diagram illustrating an example system according to some embodiments;

FIG. 4b is a schematic block diagram illustrating an example system according to some embodiments;

FIG. 4c is a schematic block diagram illustrating an example system according to some embodiments;

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As mentioned above, the drawback of processing data in the pixel domain for compressed image and video data is that processing of data may consume more power and resources as a full decoding must be performed.

As mentioned above, in addition, for modern video codecs, the processing of data directly from DCT coefficients may not provide a meaningful interpretation as intra prediction is performed before DCT transform, and only the residues produced from the intra prediction are transformed i.e. quantized, hence, the DCT or DCT like transform coefficients may not exactly reflect the image contents in the pixel domain.

In the following, embodiments will be presented where alternative approaches for processing data are described.

Data as described herein comprises video data.

Figure 1:
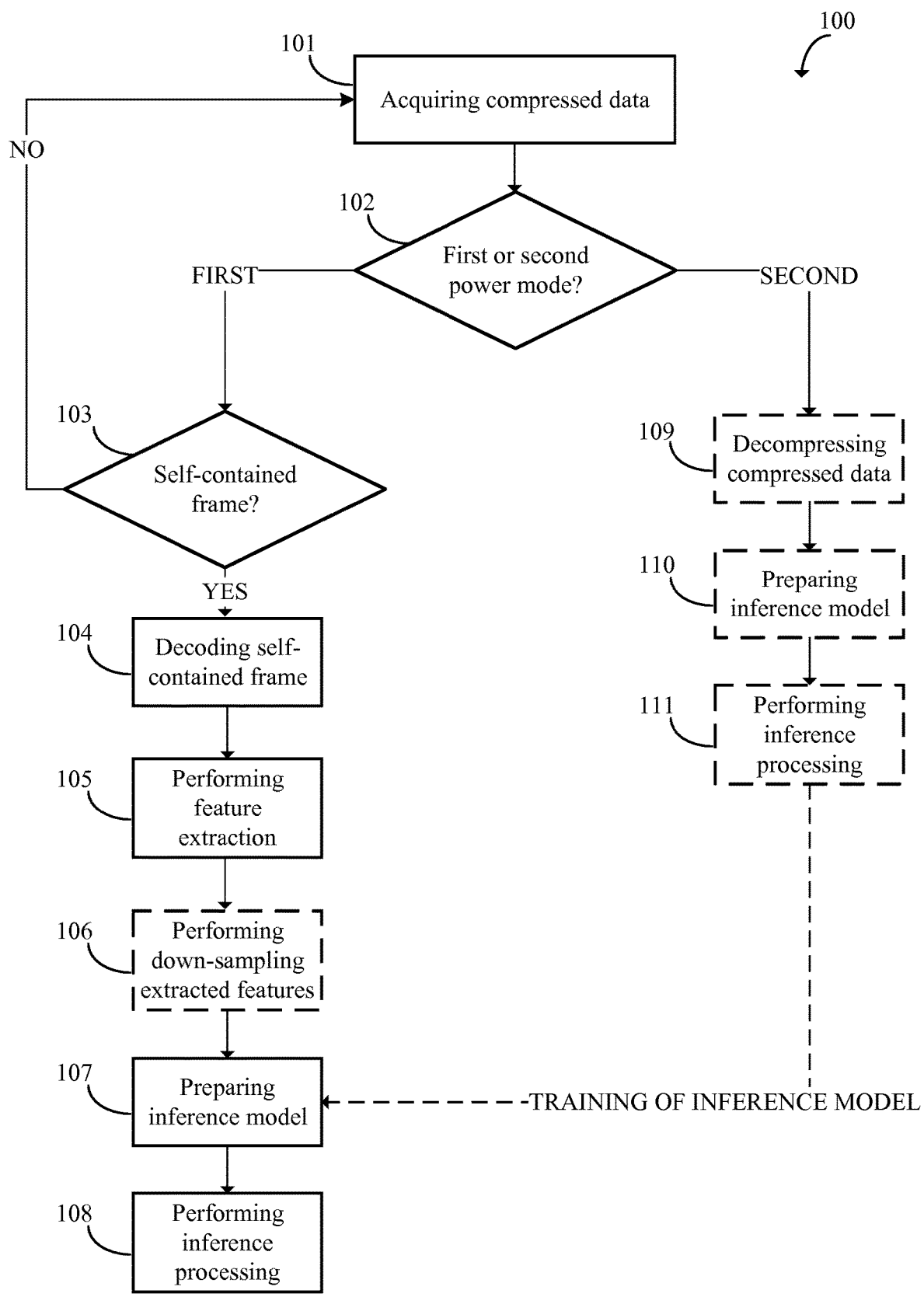
FIG. 1 is a flowchart illustrating example method steps according to some embodiments.

FIG. 1 is a flowchart illustrating method steps of an example method 100 according to some embodiments. The method 100 is for processing data in a system configured to operate in either of at least a first power mode and a second power mode, wherein the first power mode is associated with a first power level and the second power mode is associated with a second power level, the second power level being higher than the first power level, wherein the first and second power modes each are configured to prepare a respective model for inference processing. Thus, the method 100 may, for example, be performed by the system 200a of FIG. 2a and/or the system 200b of FIG. 2b and/or the system 400a of FIG. 4a and/or the system 400b of FIG. 4b and/or the system 400c of FIG. 4c and/or the arrangement 510 of FIG. 5 and/or the computer program product 600 of FIG. 6.

The method 100 comprises the following steps.

In step 101, compressed data is acquired in the system.

In some embodiments, the acquired compressed data comprises a received stream of compressed data.

For example, the received stream of compressed data may comprise a bit-stream for processing.

In step 102, it is determined whether the system operates in the first power mode or in the second power mode.

In some embodiments, the system is capable of switching between the at least first and second modes depending on the power mode of the system and/or an event indicative of battery power running low and/or a manual setting.

For example, the first power mode may comprise a low power mode i.e. a power mode in a system powered by e.g. batteries power, wherein available power in the system is below a certain threshold, and the second power mode may comprise a high power mode i.e. a power mode in a system powered by e.g. a power supply, and wherein available power in the system is above a certain threshold.

Alternatively or additionally, the switching between the at least first and second modes may be performed at the event that battery power in the system is running low i.e. from high power mode to a low power mode and/or at the manual setting of power mode of the system.

In step 103, it is determined whether the acquired compressed data comprises a self-contained frame (FIRST-path out of step 102). If not, the method returns to step 101 (NO-path out of step 103).

In some embodiments, the self-contained frame comprises an intra-prediction frame.

For example, the intra-prediction frame may require data from the current frame only for exploiting spatial redundancy i.e. correlation among pixels within one frame.

In step 104, the self-contained frame is partly decoded (YES-path out of step 103).

For example, the partly decoding of the self-contained frame may comprise entropy decoding i.e. a lossless data compression scheme.

In step 105, feature extraction of the decoded self-contained frame is performed.

In some embodiments, the extracted features comprise one or more of: prediction modes, transform coefficients, and quantization parameters.

For example, the prediction modes may comprise different directional prediction modes e.g. horizontal, vertical, and diagonal.

For example, the transform coefficients may comprise components with entries representing spatial frequencies.

For example, the quantization parameters may comprise an index used to derive a scaling matrix.

In step 106, in some embodiments, down-sampling of the extracted features is performed.

For example, the down-sampling may comprise rescaling or resampling so that a new version with a different size, i.e. a reduced size, is created.

In step 107, the model for inference processing in the first power mode in the system is prepared, wherein the model comprises inference parameters for the first power mode.

For example, the preparation of the model for inference processing may comprise loading the inference parameters, inference engine, etc.

For example, the inference parameters may comprise weights of the neural network.

In step 108, inference processing by a neural network is performed based on the extracted features and the prepared model for inference processing.

For example, the neural network may comprise a fixed neural network architecture.

In some embodiments, the inference processing in the first power mode is performed in a compressed domain comprising compressed data.

In step 109, in some embodiments, the acquired compressed data is decompressed (SECOND-path out of step 102).

For example, the decompression may comprise restoring compressed data to its original form.

In step 110, in some embodiments, the model for inference processing of the second power mode is prepared in the system, wherein the model comprises inference parameters for the second power mode.

In step 111, in some embodiments, inference processing by the neural network is performed based on the decompressed data and the prepared model for inference processing.

In some embodiments, inference processing in the second power mode is performed in a pixel domain comprising decompressed data.

In some embodiments, above described steps 101, 102, 103, 104, 105, 107, and 108 are repeated until the acquired compressed data has been processed.

In some embodiments, training of the model for inference processing corresponding to the first power mode is performed by collecting and utilizing inference information either from a trained model corresponding to the second power mode (illustrated with a dotted line from step 111 to step 107) or from a trained model independently offline (not illustrated).

For example, training of the model for inference processing corresponding to the first power mode may be performed using the information, e.g., inference results, from a trained model corresponding to the second power mode. This may be performed in a teacher-student fashion.

Additionally or alternatively, the training of the models may be performed independently offline.

In some embodiments, the inference parameters are retrieved from a storage in the system or obtained from a remote storage.

In some embodiments, the inference parameters are retrieved or obtained from storage when it is determined in which power mode the system is operating in.

An advantage of some embodiments is that alternative approaches for processing data are provided.

Another advantage of some embodiments is that power and resource consumption for processing of data may be reduced as the processing of data may be performed in a compressed domain without decompressing the compressed data.

Yet an advantage of some embodiments is that processing of data for compressed image and video data in the compressed domain may be enabled as the self-contained frame may be partly decoded and feature extraction may be performed on the partly decoded self-contained frame.

Yet another advantage of some embodiments is that processing of data in either pixel domain or compressed domain depending on the power mode of the system may be performed as the system is capable of determining in which power mode operates in and perform accordingly.

Figure 2A:
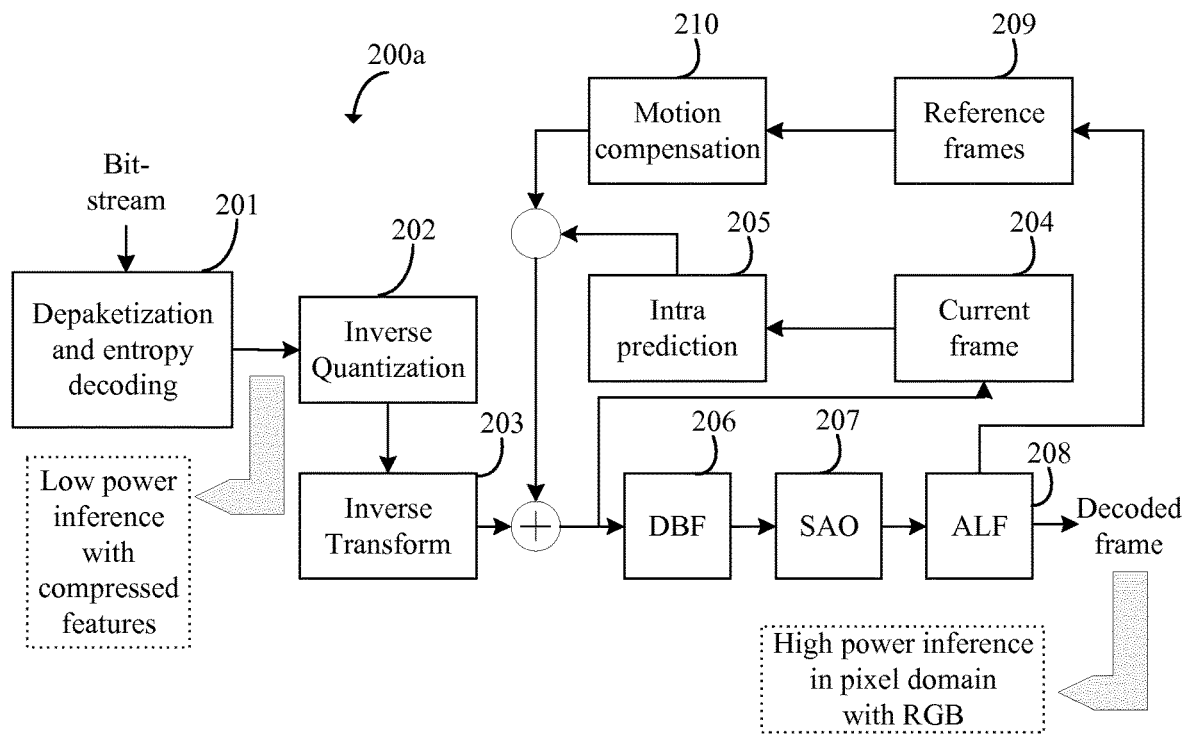
FIG. 2a is a schematic block diagram illustrating an example system according to some embodiments.

FIG. 2a is a schematic block diagram illustrating an example system 200a according to some embodiments. The system 200a is for processing data in a system configured to operate in either of at least a first power mode and a second power mode, wherein the first power mode is associated with a first power level and the second power mode is associated with a second power level, the second power level being higher than the first power level, wherein the first and second power modes each are configured to prepare a respective model for inference processing. Thus, the system 200a may, for example, perform the method steps of FIG. 1 or any other method steps described herein and/or be comprised in the arrangement 510 of FIG. 5.

The system 200a comprises modules for processing data in either of at least a first power mode and a second power mode.

For example, the system 200a may comprise a High Efficiency Video Coding (HEVC) decoder.

For the first power mode, module 201 is configured to receive a bit-stream of compressed data for depacketization and entropy decoding.

For the second power mode, module 202 is configured to perform inverse quantization on the depacketized and entropy decoded data.

Module 203 is configured to perform inverse transform, e.g. Discrete Cosine Transform (DCT), on the inverse quantized data.

Module 204 is configured to store the reconstructed current frames for the prediction performed in module 205.

Module 205 is configured to perform intra-prediction.

Module 206 is configured to apply a DeBlocking Filter (DBF), module 207 is configured to apply a Sample Adaptive Offset (SAO), and module 208 is configured to apply an Adaptive Loop Filter (ALF) on the reconstructed frame to output a decoded frame.

Furthermore, continuing in the second power mode, module 209 is configured to store reference frames, and module 210 is configured to perform motion compensation with the reference frames on the current frame being decoded.

Hence, inference processing may be performed from the compressed features or from the decoded frames.

Figure 2B:
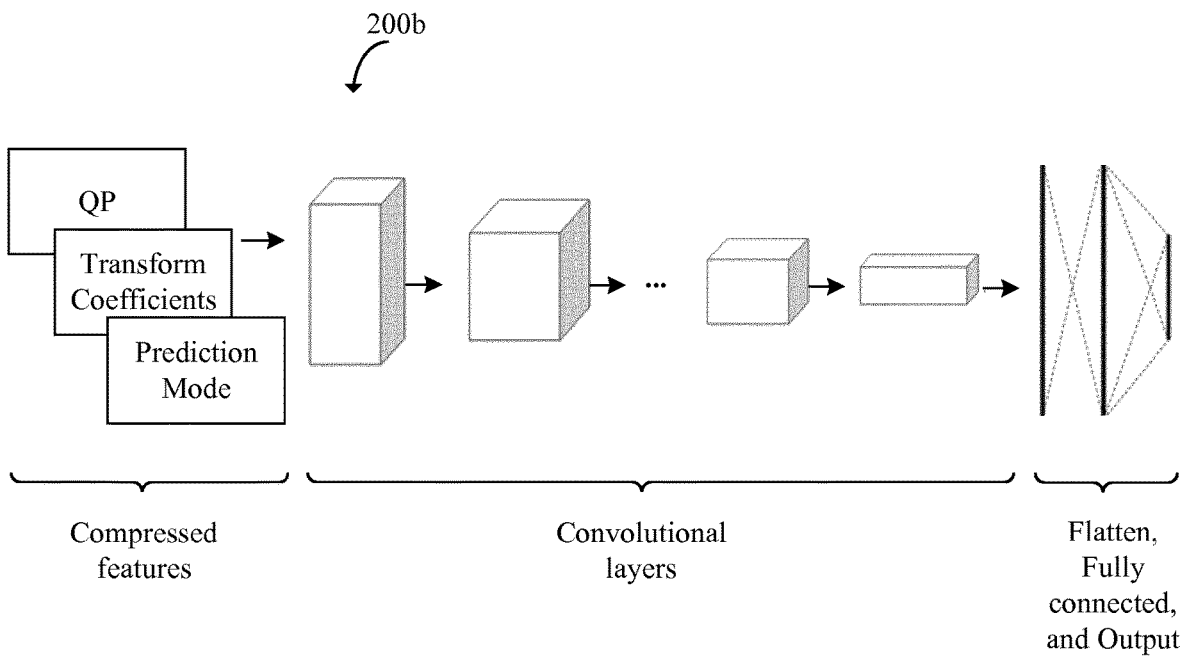
FIG. 2b is a schematic block diagram illustrating an example system according to some embodiments

FIG. 2b is a schematic block diagram illustrating an example system 200b according to some embodiments. The system 200b is for processing data in a system configured to operate in either of at least a first power mode and a second power mode, wherein the first power mode is associated with a first power level and the second power mode is associated with a second power level, the second power level being higher than the first power level, wherein the first and second power modes each are configured to prepare a respective model for inference processing. Thus, the system 200b may, for example, perform the method steps of FIG. 1 or any other method steps described herein and/or be comprised in the arrangement 510 of FIG. 5.

The system 200b comprises components for inference processing of data in a compressed domain for intra predicted frames with a neural network.

For example, the neural network may comprise a convolutional neural network (CNN) composed of convolutional layers comprising input layers, hidden layers and output layers.

Compressed features, i.e. extracted features, such as Quantization Parameters (QP), Transform Coefficients, and Prediction Mode are input into the neural network comprising convolutional layers and wherein the neural network has been prepared with a corresponding model for inference processing.

The convolutional layers are configured to perform inference processing accordingly, input feature maps are passed through CNN layers and fully connected layers and output the results.

Figure 3A:
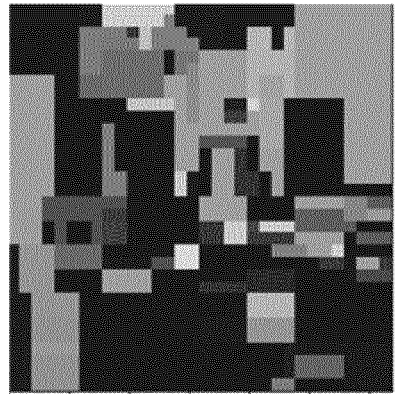
FIG. 3a is a schematic drawing illustrating an example representation according to some embodiments.

FIG. 3a is a schematic drawing illustrating an example representation according to some embodiments. The example representation comprises an example of a prediction-mode map.

Figure 3B:
FIG. 3b is a schematic drawing illustrating an example representation according to some embodiments.

FIG. 3b is a schematic drawing illustrating an example representation according to some embodiments. The example representation comprises an example of a transform-coefficient map for the prediction residue.

Figure 3C:
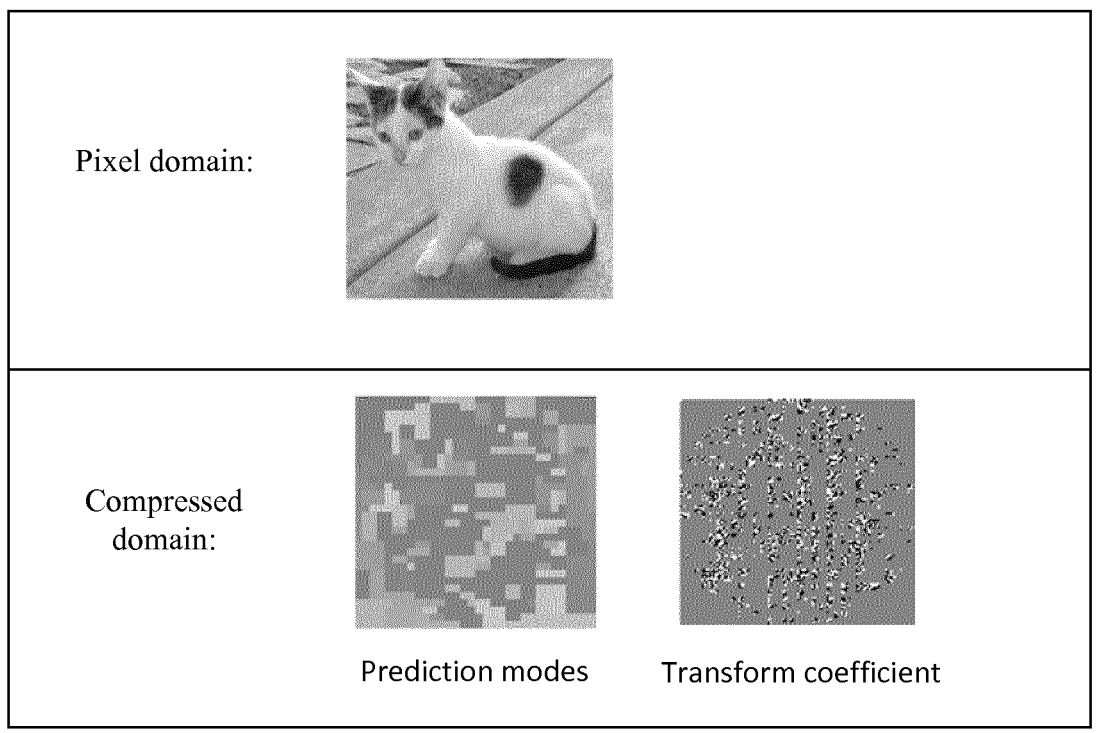
FIG. 3c is a schematic drawing illustrating example representations according to some embodiments.

FIG. 3c is a schematic drawing illustrating example representations according to some embodiments. The example representations comprise visual illustration of the features from a pixel domain and a compressed domain.

In the pixel domain, the image features may be decomposed into three channels Red Green Blue (RGB).

In the compressed domain, the features comprise prediction modes (left-hand image), transform coefficients (right-hand image), and QP.

The features may be decomposed into QP channels e.g. in an image with constant values, a fixed QP may have been used during the encoding.

FIG. 4a is a schematic block diagram illustrating an example system 400a according to some embodiments. The system 400a is for processing data in a system configured to operate in either of at least a first power mode and a second power mode, wherein the first power mode is associated with a first power level and the second power mode is associated with a second power level, the second power level being higher than the first power level, wherein the first and second power modes each are configured to prepare a respective model for inference processing. Thus, the system 400a may, for example, perform the method steps of FIG. 1 or any other method steps described herein and/or be comprised in the arrangement 510 of FIG. 5.

The system 400a comprises a video surveillance system wherein inference processing is performed in an electronic user device.

A camera only captures and compresses image and video data for transmission to the electronic user device.

FIG. 4b is a schematic block diagram illustrating an example system 400b according to some embodiments. The system 400b is for processing data in a system configured to operate in either of at least a first power mode and a second power mode, wherein the first power mode is associated with a first power level and the second power mode is associated with a second power level, the second power level being higher than the first power level, wherein the first and second power modes each are configured to prepare a respective model for inference processing. Thus, the system 400b may, for example, perform the method steps of FIG. 1 or any other method steps described herein and/or be comprised in the arrangement 510 of FIG. 5.

The system 400b comprises an Information retrieval system wherein inference processing is performed in an electronic user device.

Compressed image and video data may be stored in an internal or external storage and accessible to the electronic user device for inference processing.

FIG. 4c is a schematic block diagram illustrating an example system 400c according to some embodiments. The system 400c is for processing data in a system configured to operate in either of at least a first power mode and a second power mode, wherein the first power mode is associated with a first power level and the second power mode is associated with a second power level, the second power level being higher than the first power level, wherein the first and second power modes each are configured to prepare a respective model for inference processing. Thus, the system 400c may, for example, perform the method steps of FIG. 1 or any other method steps described herein and/or be comprised in the arrangement 510 of FIG. 5.

The system 400c comprises an information retrieval system wherein inference processing is performed in an electronic user device.

Image and video data captured from cameras on the wearables, e.g. glasses, may be compressed and transmitted to the electronic user device for inference processing.

Figure 5:
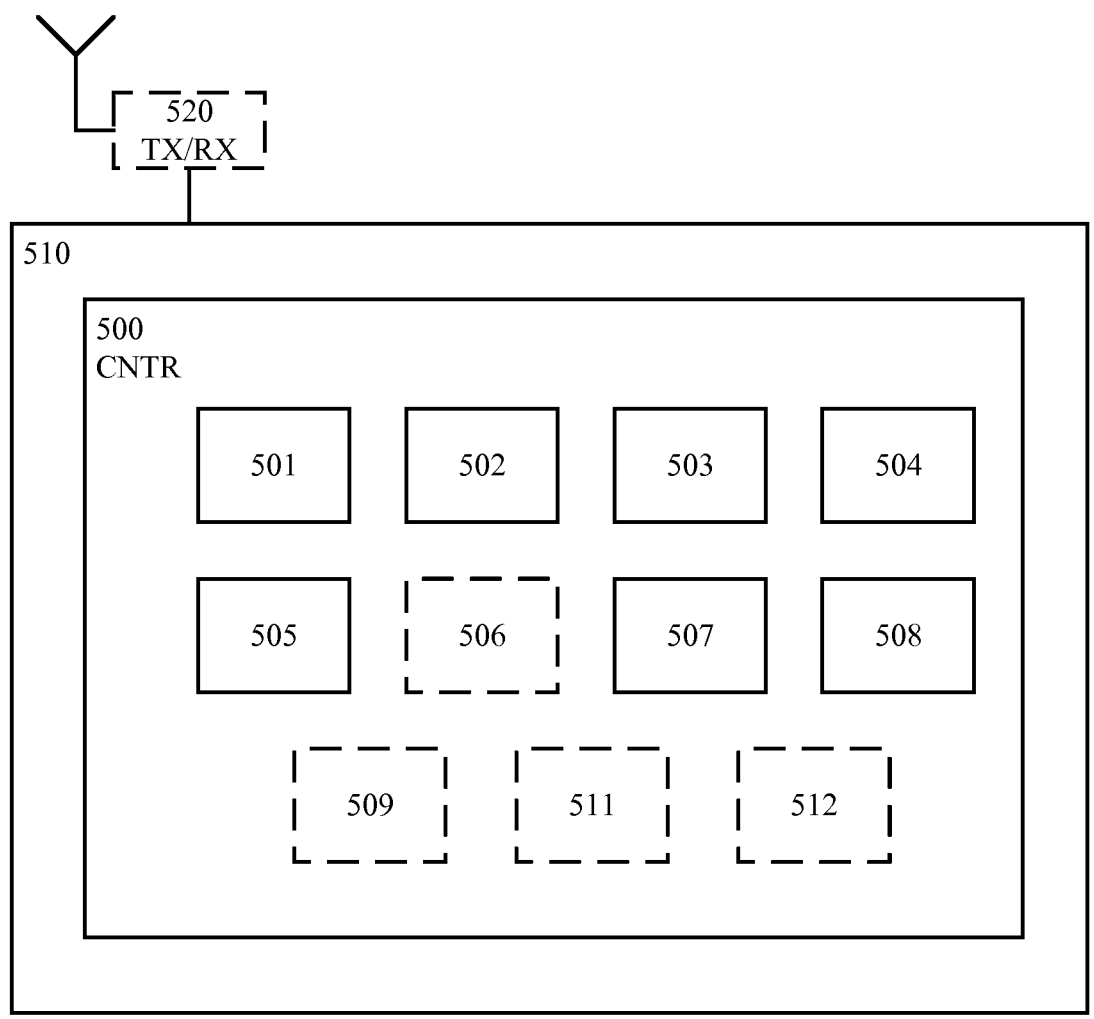
FIG. 5 is a schematic block diagram illustrating an example arrangement according to some embodiments.

FIG. 5 is a schematic block diagram illustrating an example arrangement 510 according to some embodiments. The example arrangement 510 is for processing data in a system configured to operate in either of at least a first power mode and a second power mode, wherein the first power mode is associated with a first power level and the second power mode is associated with a second power level, the second power level being higher than the first power level, wherein the first and second power modes each are configured to prepare a respective model for inference processing. Thus, the example arrangement 510 may, for example, perform the method steps of FIG. 1 or any other method steps described herein.

The arrangement 510 comprises device controlling circuitry (CNTR; e.g., a controller or a controlling module) 500, which may in turn comprise (or be otherwise associated with; e.g., connected or connectable to) an acquirer 501, e.g. acquiring circuitry, configured to acquire compressed data, and a determiner 502, e.g. determining circuitry, configured to determine whether the system operates in the first power mode or in the second power mode.

The CNTR 500 may further comprise (or be otherwise associated with; e.g., connected or connectable to) a determiner 503, e.g. determining circuitry, configured to determine whether the acquired compressed data comprises a self-contained frame, and a decoder 504, e.g. decoding circuitry, configured to partly decode the self-contained frame.

The CNTR 500 may furthermore comprise (or be otherwise associated with; e.g., connected or connectable to) a feature extractor 505, e.g. feature extracting circuitry, configured to perform feature extraction of the decoded self-contained frame, an inference model preparer 507, e.g. inference model preparing circuitry, configured to prepare the model for inference processing in the first power mode in the system, wherein the model comprises inference parameters for the first power mode.

The inference model preparer 507 may, for example, be an inference model preparer configured to prepare either of the model for the first power mode and the model for the second mode. Alternatively or additionally, the inference model preparer 507 may comprise two inference model preparers; one configured to prepare the model for the first power mode and one configured to prepare the model for the second mode.

The CNTR 500 may moreover comprise (or be otherwise associated with; e.g., connected or connectable to) an inference processing performer 508, e.g. inference processing circuitry, configured to perform inference processing by a neural network based on the extracted features and the prepared model for inference processing.

In some embodiments, the CNTR 500 further comprises a down-sampler 506, e.g. down-sampling circuitry, configured to down-sample the extracted features.

In some embodiments, the CNTR 500 further comprises a de-compressor 509, e.g. decompressing circuitry, configured to decompress the acquired compressed data, and an inference processing performer 511, e.g. inference processing circuitry, configured to perform inference processing by the neural network based on the decompressed data and the prepared model for inference processing.

In some embodiments, the CNTR 500 further comprises a model trainer 512, e.g. training circuitry, configured to train the model for inference processing in the first power mode by collecting and utilizing information of inference processing in the system performed while the system operates in the second power mode.

In some embodiments, the CNTR 500 further comprises a storage 513, e.g. memory circuitry, configured to store the inference parameters of a model corresponding to a power mode of the system.

The arrangement 510 may further comprise (or be otherwise associated with; e.g., connected or connectable to), in some embodiments, a transceiving module (TX/RX) 520, e.g. transceiving circuitry, configured to transmit and receive radio signals in the electronic user device.

Moreover, the example arrangement 510 may, for example, be comprised in an electronic user device.

In some embodiments, the electronic user device comprises any of an electronic user device connectable to a video surveillance system, an electronic user device connectable to an information retrieval system, and an electronic user device connectable to a wearable device system.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device.

Embodiments may appear within an electronic apparatus (such as a wireless communication device) comprising arrangements, circuitry, and/or logic according to any of the embodiments described herein. Alternatively or additionally, an electronic apparatus (such as a wireless communication device) may be configured to perform methods according to any of the embodiments described herein.

According to some embodiments, a computer program product comprises a computer readable medium such as, for example a universal serial bus (USB) memory, a plug-in card, an embedded drive or a read only memory (ROM).

Figure 6:
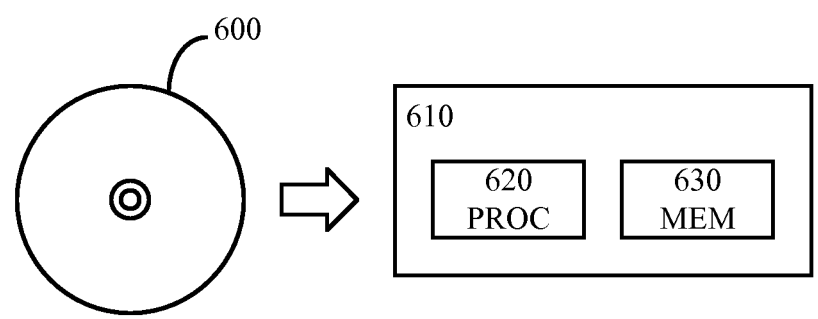
FIG. 6 is a schematic drawing illustrating an example computer readable medium according to some embodiments.

FIG. 6 illustrates an example computer readable medium in the form of a compact disc (CD) ROM 600. The computer readable medium has stored thereon a computer program comprising program instructions. The computer program is loadable into a data processor (PROC) 620, which may, for example, be comprised in a wireless communication device 610. When loaded into the data processing unit, the computer program may be stored in a memory (MEM) 630 associated with or comprised in the data-processing unit. According to some embodiments, the computer program may, when loaded into and run by the data processing unit, cause execution of method steps according to, for example, any of the methods illustrated in FIG. 1 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for processing data in a system configured to operate in either of at least a first power mode and a second power mode;
wherein the first power mode is associated with a first power level and the second power mode is associated with a second power level; the second power level being higher than the first power level; wherein the first and second power modes each are configured to prepare a respective model for inference processing; the method comprising:
acquiring compressed data;
determining whether the system operates in the first power mode or in the second power mode; and
when the system operates in the first power mode, determining whether the acquired compressed data comprises a self-contained frame, and in an event of presence of the self-contained frame:
partly decoding the self-contained frame;
performing feature extraction of the decoded self-contained frame;
preparing the model for inference processing in the first power mode in the system, wherein the model comprises inference parameters for the first power mode; and
performing inference processing by a neural network based on the extracted features and the prepared model for inference processing, wherein inference processing of data is performed in a compressed domain without decompressing the compressed data.

2. The method of claim 1, wherein the inference processing in the first power mode is performed in a compressed domain comprising compressed data.

3. The method of claim 1, further comprising performing down-sampling of the extracted features.

4. The method of claim 1, further comprising, when the system operates in the second power mode:
decompressing the acquired compressed data;
preparing the model for inference processing of the second power mode in the system, wherein the model comprises inference parameters for the second power mode; and
performing inference processing by the neural network based on the decompressed data and the prepared model for inference processing.

5. The method of claim 4, wherein inference processing in the second power mode is performed in a pixel domain comprising decompressed data.

6. The method of claim 1, further comprising training of the model for inference processing corresponding to the first power mode by collecting and utilizing inference information either from a trained model corresponding to the second power mode or from a trained model independently offline.

7. The method of claim 1, wherein the system is capable of switching between the at least first and second modes depending on the power mode of the system and/or an event indicative of battery power running low.

8. The method of claim 1, wherein the self-contained frame comprises an intra-prediction frame.

9. The method of claim 1, wherein the extracted features comprise: prediction modes, transform coefficients, and/or quantization parameters.

10. The method of claim 1, wherein the decoding comprises entropy decoding.

11. The method of claim 1, wherein the inference parameters are retrieved from a storage in the system or obtained from a remote storage.

12. The method of claim 1, wherein the inference parameters are retrieved or obtained from storage when it is determined in which power mode the system is operating in.

13. A non-transitory computer readable recording medium storing a computer program product for controlling processing of data in a system configured to operate in either of at least a first power mode and a second power mode; wherein the first power mode is associated with a first power level and the second power mode is associated with a second power level; the second power level being higher than the first power level; wherein the first and second power modes each are configured to prepare a respective model for inference processing; the computer program product comprising program instructions which, when run on processing circuitry of a data processing unit, causes the data processing unit to:
acquire compressed data;
determine whether the system operates in the first power mode or in the second power mode; and
when the system operates in the first power mode, determine whether the acquired compressed data comprises a self-contained frame, and in an event of presence of the self-contained frame:
partly decode the self-contained frame;
perform feature extraction of the decoded self-contained frame;
prepare the model for inference processing in the first power mode in the system, wherein the model comprises inference parameters for the first power mode; and
perform inference processing by a neural network based on the extracted features and the prepared model for inference processing, wherein inference processing of data is performed in a compressed domain without decompressing the compressed data.

14. A data processing system for processing data in a system configured to operate in either of at least a first power mode and a second power mode; wherein the first power mode is associated with a first power level and the second power mode is associated with a second power level; the second power level being higher than the first power level; wherein the first and second power modes each are configured to prepare a respective model for inference processing; the data processing system comprising:
processing circuitry; and
a computer readable storage medium operatively connected with the processing circuitry, the computer readable storage medium storing a computer program product which when run on the processing circuitry causes the system to:
acquire compressed data;
determine whether the system operates in the first power mode or in the second power mode;
determine whether the acquired compressed data comprises a self-contained frame;
partly decode the self-contained frame;
perform feature extraction of the decoded self-contained frame;
prepare the model for inference processing in the first power mode in the system, wherein the model comprises inference parameters for the first power mode; and
perform inference processing by a neural network based on the extracted features and the prepared model for inference processing, wherein inference processing of data is performed in a compressed domain without decompressing the compressed data.

15. The data processing system of claim 14, wherein the processing circuitry further causes the system to down-sample the extracted features.

16. The data processing system of claim 14, wherein the processing circuitry further causes the system to:
decompress the acquired compressed data;

perform inference processing by the neural network based on the decompressed data and the prepared model for inference processing.

17. The data processing system of claim 14, wherein the processing circuitry further causes the system to train the model for inference processing in the first power mode by collecting and utilizing information of inference processing in the system performed while the system operates in the second power mode.

18. The data processing system of claim 14, wherein the computer readable storage medium is further configured to store the inference parameters of a model corresponding to a power mode of the system.

19. An electronic user device, comprising:
   circuitry for processing data in a system configured to operate in either of at least a first power mode and a second power mode; wherein the first power mode is associated with a first power level and the second power mode is associated with a second power level; the second power level being higher than the first power level; wherein the first and second power modes each are configured to prepare a respective model for inference processing; and
   a computer readable storage medium operatively connected with the circuitry, the computer readable storage medium storing a computer program product which when run on the circuitry causes the device to:
   acquire compressed data;
   determine whether the system operates in the first power mode or in the second power mode;
   determine whether the acquired compressed data comprises a self-contained frame;
   partly decode the self-contained frame;
   perform feature extraction of the decoded self-contained frame;
   prepare the model for inference processing in the first power mode in the system, wherein the model comprises inference parameters for the first power mode; and
   perform inference processing by a neural network based on the extracted features and the prepared model for inference processing, wherein inference processing of data is performed in a compressed domain without decompressing the compressed data.

20. The electronic user device of claim 19, wherein the electronic user device comprises: an electronic user device connectable to a video surveillance system, an electronic user device connectable to an information retrieval system, and/or an electronic user device connectable to a wearable device system.

* * * * *